United States Patent

[11] 3,595,296

[72] Inventor James R. Fisher
Piscataway, N.J.
[21] Appl. No. 823,928
[22] Filed May 12, 1969
[45] Patented July 27, 1971
[73] Assignee Union Carbide Corporation
New York, N.Y.

[54] APPARATUS FOR FLASH EVAPORATING, FILMING AND EXTRUDING VISCOELASTIC MATERIAL
6 Claims, 3 Drawing Figs.

[52] U.S. Cl. .................................................... 159/2,
159/6, 159/13
[51] Int. Cl. .................................................... B01d 1/28,
B01d 1/22
[50] Field of Search........................................... 159/6 W,
13 A, 47, 2 E, 13, 13 A, 5, 7, 2; 18/12 SA, 12 SH,
12 SV, 12 DR; 202/236

[56] References Cited
UNITED STATES PATENTS
3,211,209 10/1965 Latinen et al.................. 159/6 W
3,242,969 3/1966 Kiguchi......................... 159/6 W
3,217,783 11/1965 Rodenacker.................. 159/2 E
3,361,537 1/1968 Ferrante....................... 23/283

Primary Examiner—Wilbur L. Bascomb, Jr.
Assistant Examiner—J. Sofer
Attorneys—Paul A. Rose, Gerald R. O'Brien, Jr. and Aldo J. Cozzi ABSTRACT: Apparatus for evacuating viscoelastic fluids from a cylindrical vessel comprising rotating said fluid at the base of said vessel while, concurrently, directing said fluid toward and through an annular exit space around the peripheral internal walls of said vessel and exerting a downward force on said fluid contact said base of said vessel. A specific form of the invention may be employed for the devolatilization of polymeric materials.

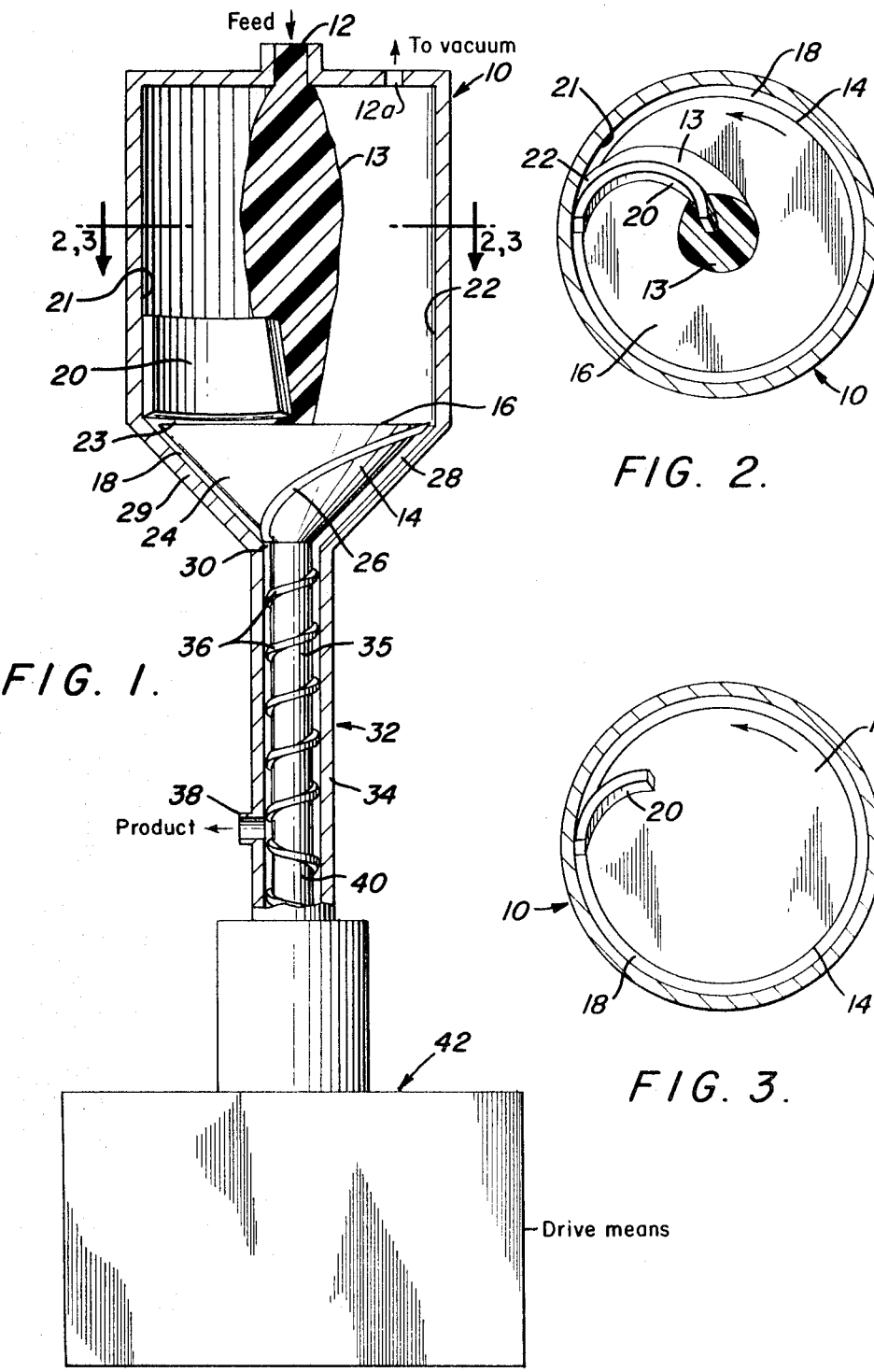

APPARATUS FOR FLASH EVAPORATING, FILMING AND EXTRUDING VISCOELASTIC MATERIAL

The present invention relates to improved method and apparatus for the evacuation of vessels and, more particularly, to the evacuation of viscoelastic fluids, i.e., high viscosity liquids, from cylindrical vessels.

Heretofore, considerable problems have been presented in the removal of viscoelastic fluids from cylindrical containers, such as reactors, autoclaves, devolatilization chambers, and the like. Many methods and related apparatus have been suggested for evacuating viscoelastic fluids from cylindrical vessels. One such method is disclosed and claimed in U.S. Pat. No. 3,395,746, issued on Aug. 6, 1968 to T. T. Szabo et al. As there disclosed, foamy liquid polymer composition is discharged from a cylindrical vessel, after treatment, by passage through a pair of counterrotating, intermeshing extruder screws. A throughput capacity limitation is inherent in the use of such means to evacuate vessels on a continuous, high-throughput basis.

Other methods for accomplishing the evacuation of cylindrical vessels are disclosed in U.S. Pat. Nos. 3,113,843 and 3,361,537, both of which employ conical-shaped, ribbon-type extensions within the cylindrical vessel which feed material from the sidewalls of the vessel to a screw extruder. In addition to requiring a liquid level within the cylindrical vessel, the methods and apparatus of these patents present the same inherent limitation as to throughput capacity for operation on a continuous basis.

Accordingly, it is a prime object of the present invention to provide method and apparatus for the effective evacuation of viscoelastic fluids from cylindrical vessels, whereby continuous operation at high-throughput capacities can be achieved.

In accordance with one aspect of the present invention, a method is provided for the evacuation of viscoelastic fluids from cylindrical vessels which comprises rotating said fluid at the base of said vessel while, concurrently, directing said fluid toward and through an annular exit space around the peripheral internal walls in the region of the base of said vessel and exerting a downward force on said fluid contacting said base of said vessel.

Apparatus suitable for employment in the practice of the method aspect of the invention is apparent in the following specification and drawings, in which:

FIG. 1 is a schematic, partial elevational sectional view of apparatus embodying the invention;

FIG. 2 is a cross-sectional view taken along line 2—2 of FIG. 1; and

FIG. 3 is a cross-sectional view of modified apparatus, as would be seen if taken along the line 3—3 of FIG. 1 without the flow of the foamy polymer strand shown in FIG. 1.

Referring specifically to the drawings, a cylindrical vessel 10, in the illustrated case a devolatilization chamber, is provided having inlet means 12 at the upper end thereof for introducing polymeric material and vacuum vent means 12a. A foamy strand 13 of polymeric material is formed by the introduction of liquid polymeric composition into devolatilization chamber 10, which is maintained at a relatively reduced pressure in order to flash vaporize the volatiles and form the foamy strand. The base of devolatilization chamber 10 comprises rotating member 14 providing at its top rotating base surface 16. The diameter of rotating base surface 16 is slightly less than the inner diameter of the walls of the devolatilization chamber, thereby providing annular exit space 18 between rotating member 14 and the walls of the devolatilization chamber.

Baffle plate means 20 are provided, secured to the sidewalls 21 of devolatilization chamber 10. Baffle plate means 20 preferably comprises a hemicylindrical tube section having a diameter of approximately one-half the inner diameter of the devolatilization chamber and is preferably positioned so as to be radially mounted within the devolatilization chamber with its curvature convexly opposed to the direction of rotation of rotating base surface 16. A converging recess region 22 is thereby provided between sidewalls 21 of devolatilization chamber 10 and baffle plate means 20.

A relatively small, constant, predetermined clearance 23 is provided between the lower portion of baffle plate means 20 and rotating base surface 16.

It has been found to be essential in the practice of the method and apparatus that downward forces be exerted on the viscoelastic fluid positioned at the base of the cylindrical vessel to be evacuated. This is preferably accomplished by an inclination of the baffle plate means, in the direction opposite to the direction of rotation, from a position normal to the surface of the rotating base. The imposition of this force and the resulting compression of the viscoelastic fluid at the base of the vessel causes the fluid to adhere to the rotating surface and produces both a component of the pumping action which feeds the material into the converging recess region, as well as the action which causes a portion of the material behind it to pass through the predetermined clearance between the baffle plate means by adhering to the surface of the rotating base.

Rotating member 14 is in the shape of an inverted truncated cone having, as mentioned hereinabove, its base surface positioned upwardly as rotating base surface 16 and its truncated conical surface 24 positioned downwardly. A spiral, helical screw means 26 is positioned on conical surface 24. A conical annular passage 28 is provided between converging base walls 29 of the devolatilization chamber and truncated conical surface 24 which communicates with discharge port means 30 at the lower end thereof.

Extruder means 32 is axially and integrally connected to and communicating at its inlet with a discharge port means 30. The extruder means 32 comprises an outer housing 32 and extruder screw 35 having a forward screw flight 36. Material is passed under compression through the extruder and discharged through discharge port means 38. A reverse screw flight 40 is provided, below extruder discharge port means 38, to assist in the discharge of material therefrom.

The shafted assembly of extruder screw 35 and rotating member 14 is commonly driven by drive means 42.

In operation, polymeric material is flashed through inlet means 12 to the devolatilization chamber 10 to release volatiles and form the foamy strand 13 (or multiple strands) which is preferably axially introduced into the chamber as shown in the embodiments of FIGS. 1 and 2. The foamed material passes toward the base end of the devolatilization chamber and collects behind the baffle plate means, as shown in FIG. 2 of the drawings. The rotation of rotating base surface 16 may cause the buildup of the foamed plastic material on that rotating base surface in the pattern schematically shown in FIG. 2.

In operation of the devolatilizer, it has been found that the buildup of material behind the baffle is a function of the speed of rotation. At high speeds, i.e., approximately 92 r.p.m., it was found that no buildup of material was formed. The material was conveyed to the edge of the rotor fast enough and at the high speeds the screw would remove the material fast enough such that no roll was formed. At speeds lower than this, i.e., around 40—50 r.p.m., a buildup was formed behind the baffle, and as rotor speed decreased the roll increased in size.

Rotation causes the feeding of material toward the outer periphery of the base surface and effects a pumping action of the material into the converging recess region 22. At the same time, the material behind that in the converging recess region 22 passes to the baffle and a sized thin film of material is passed through the predetermined clearance 23 (between baffle plate means 20 and rotary base surface 16) to continuously provide the exposure of a new thin film of foamed plastic material to the devolatilization chamber. This will assist in effecting more complete devolatilization of the material when the method and apparatus are employed for devolatilization applications. It is important to note that, when the present invention is employed for devolatilization applications, the apparatus should be operated so that there is no appreciable fluid level or stagnant areas where fluid material can build up.

In the modified embodiment of apparatus shown in FIG. 3 of the drawings, a full hemicylindrical plate baffle means is not employed, the baffle plate means there being a section or portion of hemicylindrical plate. In the case of this embodiment, it is to be understood that, where the apparatus is to be operated as a devolatilizer, the incoming foamy strand of polymeric material should, most preferably, be introduced axially into the devolatilizing chamber, rather than introduced nearer the outer periphery. This is so since it is desirable to keep the foamy strand equidistant from the chamber walls so that, as the strand is blown about by escaping gaseous volatiles, it will not tend to adhere to one side of the chamber. This is to be avoided if reliable operation of the unit is desired. If one were to introduce the foamy strand off center in the chamber, then the shortest distance to the chamber wall would require a larger diameter chamber than if the stream were introduced on the chamber axis. This would result in increased cost. If axial introduction is employed in the apparatus of the FIG. 3 embodiment, it is necessary to rely on centrifugal forces to assist in the passage of foamed polymeric material from the center to the outer regions of the rotating base surface, in order to enable it to reach the region of the baffle plate means and produce the consequent pumping action necessary for the evacuation of material from the cylindrical vessel.

It is believed that the total pumping action which effects evacuation of material from the cylindrical vessel through annular exit space 18 is contributed by the following components: the confining action through direction and compression into the converging recess region 22; the viscoelastic forces generated within the fluid material; and the compressive pumping action of the helical compression screw means 26 which receives the material from the annular exit space 18.

After passage of the foamy polymeric material into the conical annular passage 28, it is preferably compressed by helical compression screw means 26 to effect further devolatilization. Therefore, the volatiles driven off by compressive devolatilization in annular passage 28 pass back through the foamy polymeric material mass to the devolatilization chamber.

The volatiles are distributed quite slowly and uniformly in their return through the mass of foamed polymeric material being treated. There is no bubble formation in or on the buildup of material formed behind the baffle in the apparatus of the invention. The major portion of the volatiles are removed from the polymeric material in the flash chamber proper as the foaming strand passes down through it. The additional devolatilization from surface regeneration, provided between baffle and rotor surface and in the annular passage 28, is not a foamy-type devolatilization, i.e., no large bubbles or cells are formed, since there are not enough volatiles remaining in the solution to create a large number of bubbles.

The most desirable angular driving speeds to be employed may vary considerably, depending upon the viscosity and composition of the viscoelastic fluids being evacuated from the cylindrical chamber. Similarly, the most desirable speeds may vary widely, depending upon the type of processing treatment being effected on the viscoelastic fluids. For example, where it is desired merely to evacuate viscoelastic fluid from a cylindrical vessel (such as an autoclave or other reactor, an extruder hopper, or a bin containing solid particles or slurries), flow rate capabilities may be the prime determinant of most preferred angular velocities of rotation. In addition, where treatment of the material is being carried out during this evacuation of viscoelastic fluid from the vessel (such as devolatilization), a significantly different angular velocity of rotation and consequent flow rate may be most preferable. In practice, angular velocities less than 10 r.p.m. have been employed for some applications, whereas angular velocities of the order of 100 r.p.m. and higher have also been employed.

As specific examples of operations of the method of the present invention, streams of polymeric fluid were introduced into a devolatilization chamber of the type shown in the figures of the drawings, having a height of 24.25 inches and an inside diameter of 6 inches, in the form of a ⅛-inch diameter of crystal polystyrene and ethyl benzene. The baffle was inclined against the direction of rotation at an angle of approximately 18° from a perpendicular to the rotating base surface. The polymeric fluid was fed to and evacuated from the chamber under the following conditions for each of the seven examples listed in the following table.

TABLE

| Inlet solvent concentration lb. solvent/lb. dry polymer, percent | Discharge solvent concentration lb. solvent/lb. dry polymer, percent | Flash chamber pressure, mm. Hg absolute | Inlet temp., °C. | Discharge temp., °C. | Rotor speed, r.p.m. | Flow rate of solution (inlet) lb./hr. |
|---|---|---|---|---|---|---|
| 33.3 | 1.050 | 53 | 232 | 192.4 | 92 | 18.24 |
| 33.3 | .370 | 52 | 232 | 191.7 | 92 | 18.36 |
| 25 | .253 | 35 | 232 | 201.8 | 92 | 12.36 |
| 25 | .393 | 37 | 232 | 201.8 | 92 | 13.8 |
| 25 | .564 | 38 | 232 | 202.1 | 92 | 13.74 |
| 5 | .198 | 31 | 232 | 226.1 | 92 | .66 |
| 5 | .386 | 100 | 232 | 226.3 | 92 | 3.48 |

What I claim is:

1. Apparatus for evacuating viscoelastic fluid from a generally vertical cylindrical vessel comprising: cylindrical vessel means having inlet means near the upper end thereof, and a rotating member mounted in the base thereof so as to provide a rotating base circular plane surface and an annular exit space around the peripheral internal walls of said vessel, and baffle plate means secured to the sidewalls of said vessel in the vicinity of and relatively close clearance with said base and positioned to form an acute dihedral angle with said vessel sidewalls on the upstream side of the baffle with respect to the direction of rotation of said base and to direct said fluid from said rotating base surface to the point of said annular exit space around the peripheral internal walls of said vessel which is the vertex formed by the sidewalls, baffle and base.

2. Apparatus in accordance with claim 1, wherein said baffle plate means is inclined, opposite to the direction of rotation of said rotating base surface, to apply a force to the fluid against said rotating base surface.

3. Apparatus in accordance with claim 1, wherein said baffle plate means comprises a hemicylindrical tube section having a diameter approximately one-half the diameter of said cylindrical vessel means and positioned so as to be radially mounted within said vessel with its curvature convexly and opposed to the direction of rotation of said rotating base surface.

4. Apparatus in accordance with claim 1, wherein said vessel comprises a reduced pressure devolatilization chamber and said inlet means comprises a confining passage through which liquid polymer material is discharged into said chamber and flashed to form a foamy strand of polymer.

5. Apparatus in accordance with claim 4, wherein said rotating means comprises an inverted conical body whose base surface comprises said rotating base surface and whose conical surface carries helical compression screw means cooperating with the internal conical walls of said vessel, for removing said fluid, under compression, from said annular exit space to a discharge port positioned near the apex of said inverted conical body.

6. Apparatus in accordance with claim 5, wherein said rotating means and the discharge port defining portion of said vessel are axially and integrally connected, externally of said vessel, with extruder means for further compressing said fluid discharged from said vessel.